Patented Feb. 25, 1936

2,032,239

UNITED STATES PATENT OFFICE 2,032,239

MANUFACTURE OF AN IMPROVED VITREOUS MATERIAL

Albert William Henry Wedlock, Leyton, London, England

No Drawing. Application June 10, 1935, Serial No. 25,964. In Great Britain October 26, 1933

7 Claims. (Cl. 106—36.2)

This invention relates to an improved vitreous material and a method of manufacturing the same, the object of the invention being to produce a vitreous material which apart from having high di-electric properties possesses in an unusual degree the quality of adhesion to metal, especially those metals that are largely used in the mechanical arts such as inter alia steel and cast iron, aluminium, bronze and gun metal. Moreover the material is capable of being moulded, pressed and rolled, and accordingly has the widest possible field of application for electrical, mechanical and physical apparatus.

Amongst the many applications to which the material lends itself is the manufacture of high pressure gas seals, for the leading-in insulators for high electric frequency mercury converters and allied purposes wherein high quality insulation and fluid tightness is possible between a central metal electrode, the vitreous material itself and an outer retaining metal part.

The invention is an improvement in a material at present denoted by the trade name "Mycalex" and which is formed from an admixture of a low fusing point vitreous material compounded with powdered mica and/or asbestos and the mass heated so that the mica and/or asbestos is bonded to the vitreous material at a temperature below the point of total dehydration, as is more fully disclosed in Letters Patent of Percy Broadbent Crossley, Re-issue No. 15,727. This material is at present obtainable in the form of sheets, rods and other shapes, and it has the advantage that it can be sawn, drilled, machined and otherwise tooled.

According to the invention an improved vitreous material capable of adhesion to metallic surfaces is provided consisting of an admixture of mica and/or asbestos with dried and finely ground ceramic materials including a proportion of cryolite and alkaline carbonates.

The invention also consists in a method of manufacturing an improved vitreous material capable of adhesion to metallic surfaces comprising the step of admixing mica and/or asbestos with dried and finely ground ceramic materials including a proportion of cryolite and alkaline carbonates.

In carrying the invention into effect and in the preferred manner the ceramic materials consist of the following ingredients the proportions thereof being by weight

|  | Per cent |
|---|---|
| Cryolite ($3NaF,AlF_3$) | 20 |
| Barium carbonate ($BaCO_3$) | 10 |
| Potassium carbonate ($K_2CO_3$) | 13 |
| Soda ash ($Na_2CO_3$) | 9 |
| Boric acid ($H_3BO_3$) | 48 |

These materials are ground to a fine powder and then carefully admixed and then passed through a drying furnace at 500° C. until the moisture of crystallization has been driven off, without producing fusion or vitrification leaving a white glass frit with a gravity loss of approximately 35%. The frit thus produced is then ground to a fine powder to pass 120 x 120 mesh per square inch.

The mica product is ground to an equal fineness and then

40% by weight of frit is added to 60% by weight of mica the whole being compounded in a mixing machine 8% of water being added to the mixture as a spray or mist.

At this point and to obtain a high quality of material previously heat treated Mycalex ground to a fine powder may be added, the compounding being as follows:—

| | |
|---|---|
| Mica | 52.2% |
| Mycalex | 13% |
| Frit | 34.8% |
| | 100.0% | these weights being ascertained prior to wetting.

The damped admixture is then subjected to cold pressing, the moisture present being just sufficient to cause a binding without adhesion to the mould, and if the mica prior to mixing be not sufficiently dry a slightly less addition of water is employed. In this connection it is preferable not to dry the mica or asbestos unless under temperature control to avoid crystal degradation. As micas vary in this respect, the point of breakdown should be found empirically and the furnace drying levels set below this figure. The pressure employed is approximately 1½ tons per square inch and this pressure is maintained for at least ten minutes. The billets produced from pressing require no intermediate drying but are inserted as blocks, scales or thick plates into the furnace within which they are progressively heated to 620° C. or thereabouts, the period of heat soak depending upon the thickness of the billet used, and the heat level being such that plasticity shall have set in. The material from the furnace is then used for moulding, the parts or moulds to receive the material being treated and the material fed from the furnace to the press, with the least possible delay. Pressings should remain in the mould under pressure, as the material in cooling tends to swell, this feature enabling a hermetic seal to be produced between metal parts and the material itself.

The property of metallic adhesion of the finished material even when made in slabs or blocks is very pronounced. Thus a block of finished material made according to this invention may have a layer of metal such as aluminium cast upon its surface, and the metal and material upon cooling are inseparable and can be tooled, sawn or otherwise worked together without the one material becoming detached from the other.

The di-electric properties of the vitreous material hereunder produced are good, and it also possesses in high degree resistance to shock; to a limited extent it will bend without crazing or cracking.

The figures of admixture given above are those best suited for the purpose set forth, but departure from such specific quantities can be made within reasonable limits without great variation of the product and such variations are within the scope of the present invention.

I claim:

1. In the method of manufacturing a vitreous material, the steps of reducing predetermined quantities of boric acid and alkali carbonates to comparatively fine powders, mixing said substances and heating the mixture to a temperature sufficiently high to drive off the water of crystallization and produce a frit, but not high enough to produce fusion or vitrification of the frit, reducing said frit to a comparatively fine powder, admixing said frit with powdered mica of substantially the same fineness as said frit in the presence of a small quantity of water, and heating the product to a temperature sufficiently high to initiate plasticity therein.

2. The method described in claim 1, wherein said first-named temperature is in the neighborhood of 500° C. and said second-named temperature is in the neighborhood of 620° C.

3. The process described in claim 1, wherein said alkali carbonates comprise barium carbonate and potassium carbonate.

4. The method described in claim 1, wherein said mixture of frit and mica is moulded into billets under a comparatively high pressure prior to heating the same into a plastic state.

5. The method described in claim 1, wherein said frit and mica are mixed substantially in the ratio of 40% to 60% prior to heating the said mixture into a plastic condition.

6. In a method of producing vitreous materials, the steps of reducing approximately 20% of cryolite, 23% alkali carbonates and 48% boric acid to a fine powder, mixing and heating said substances to approximately 500° C. to form a frit, reducing the frit to a powder, mixing said frit with an approximately equal weight of powdered mica in the presence of moisture, pressing said mixture to form billets, and heating said billets to a temperature in the neighborhood of 620° C. to render the same plastic.

7. The method described in claim 1, wherein said frit is also admixed with powdered "Mycalex" prior to heating the same to initiate plasticity therein.

ALBERT WILLIAM HENRY WEDLOCK.